Figure 1:
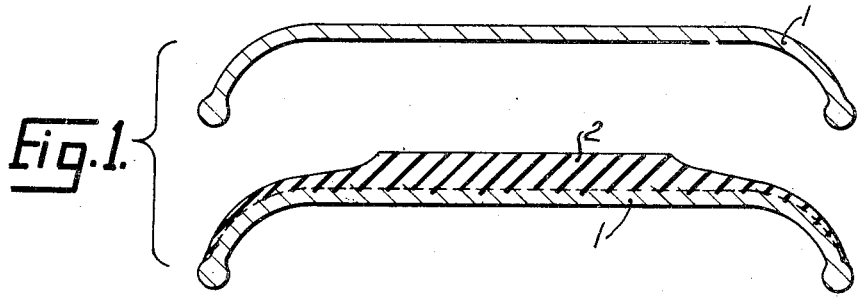

July 19, 1949.  C. E. MAYNARD  2,476,884
METHOD FOR TIRE MANUFACTURE
Filed Oct. 9, 1946  4 Sheets-Sheet 1

INVENTOR
CHARLES E. MAYNARD
BY Chapin & Neal
ATTORNEYS

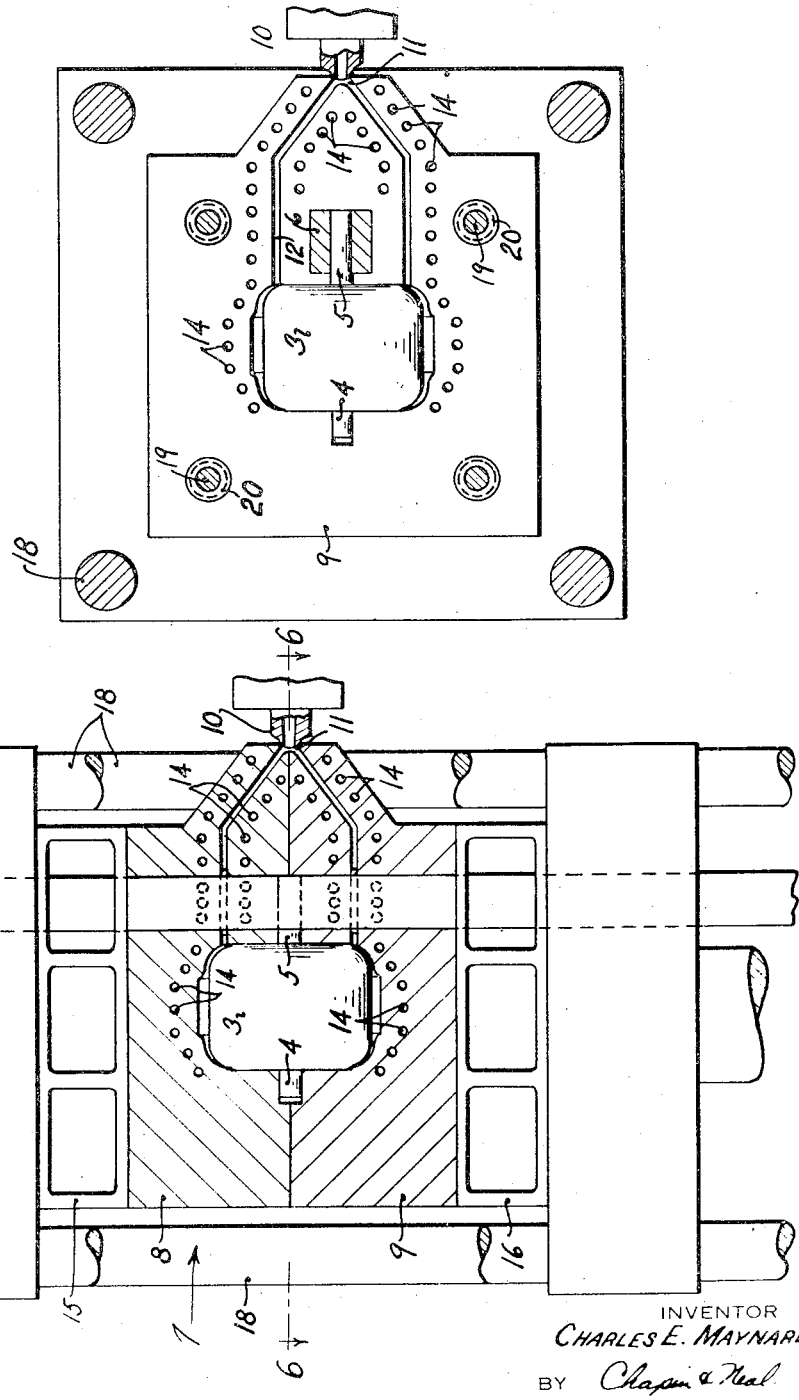

July 19, 1949.                    C. E. MAYNARD                    2,476,884
                           METHOD FOR TIRE MANUFACTURE
Filed Oct. 9, 1946                                          4 Sheets-Sheet 3

INVENTOR
CHARLES E. MAYNARD
BY Chapin & Neal
ATTORNEYS

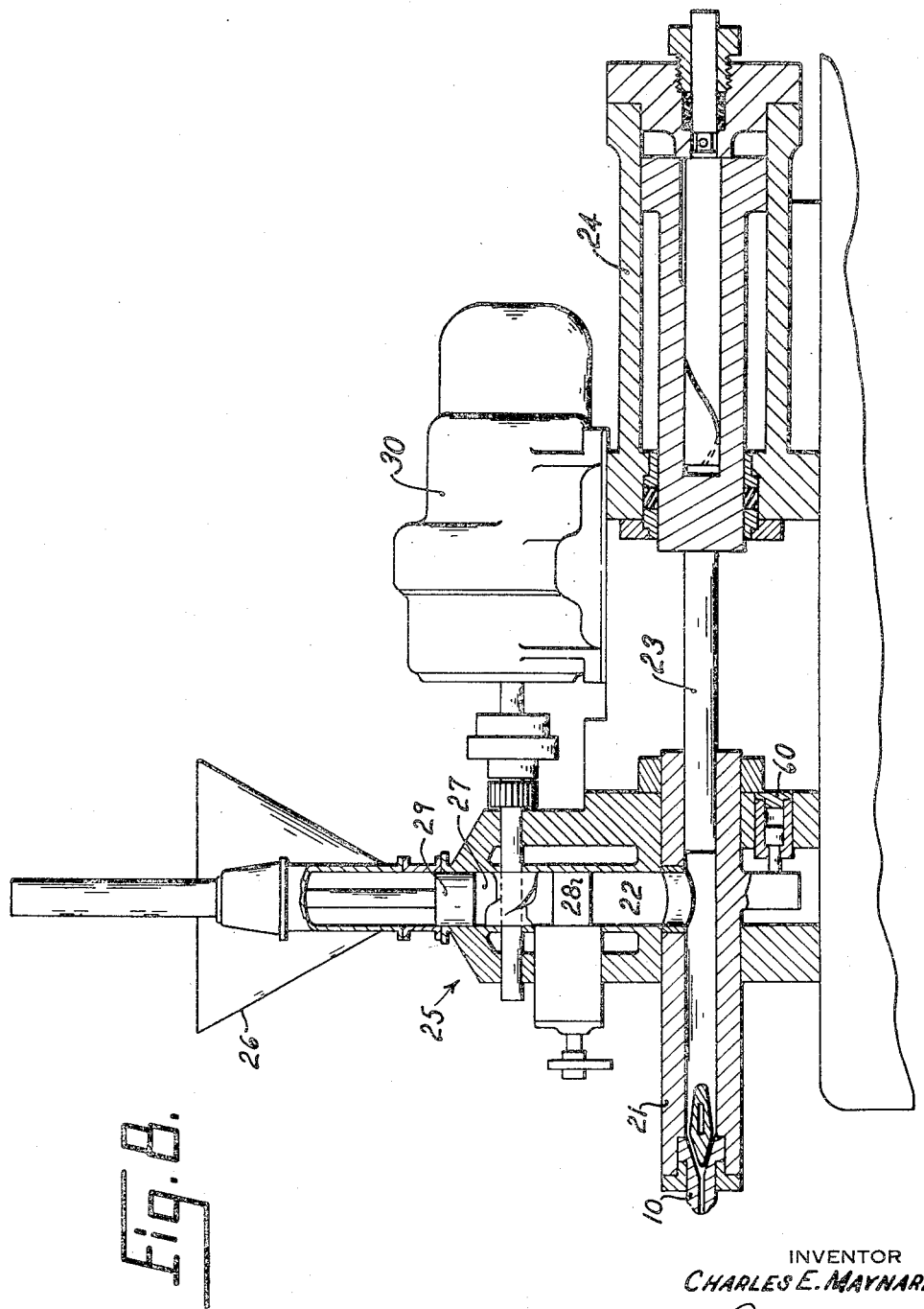

Patented July 19, 1949

2,476,884

UNITED STATES PATENT OFFICE 2,476,884

METHOD FOR TIRE MANUFACTURE

Charles E. Maynard, Florence, Mass., assignor to Pro-Phy-Lac-Tic Brush Company, Florence, Mass., a corporation of Delaware Application October 9, 1946, Serial No. 702,117

2 Claims. (Cl. 154—14)

This invention relates to improvements in methods for tire manufacture. Its purpose is to make better tires by improving the method of making tires. The better product results from the improved method. In addition to, and apart from, the benefit of the improved product, the new method will give benefits resulting from the simplification of operating steps in the factory as compared to the current manufacturing or routine steps now generally used by tire manufacturers.

The routine tire manufacturing steps are so well known as to need no full account herein but some will be referred to for comparison in disclosing my new method.

The new method includes the steps of making the tire carcass all ready to have the tread or covering rubber applied; assembling the carcass as part of a mold, injecting the tread or covering rubber into the mold by an injection molding machine to fill the mold cavity, such cavity being annular with the desired tread or covering rubber profile at the top and the carcass part of the mold at the bottom of the annular cavity; applying pressure from the injection machine to the tread or covering rubber in the mold until it sets enough for removal with the carcass on which it has then been bonded by such pressure. I prefer to add more steps to get more new manufacturing advantages before the tire is taken from the vulcanizing mold as a finished product. The additional steps are to shape the carcass while still hot from the tread applying mold; in the shaping step to insert the thick vulcanizing bag or tube still hot from use in vulcanizing another tire; and to put the raw tire thus shaped and its vulcanizing bag while both are still hot from previous operations, into a hot vulcanizing mold for the final step in manufacture.

These steps and their various relations will be explained further. It should be obvious however to one knowing the tire making art, from the statement of my method steps in sequence, that the procedure outlined is a substantial simplification and has other advantages over the procedure now being generally used in producing the great number of tires in today's routine factory practice. The result of the new method in improving the product can be stated better after a more specific description of the method is given along with the accompanying drawings.

Figure 4:
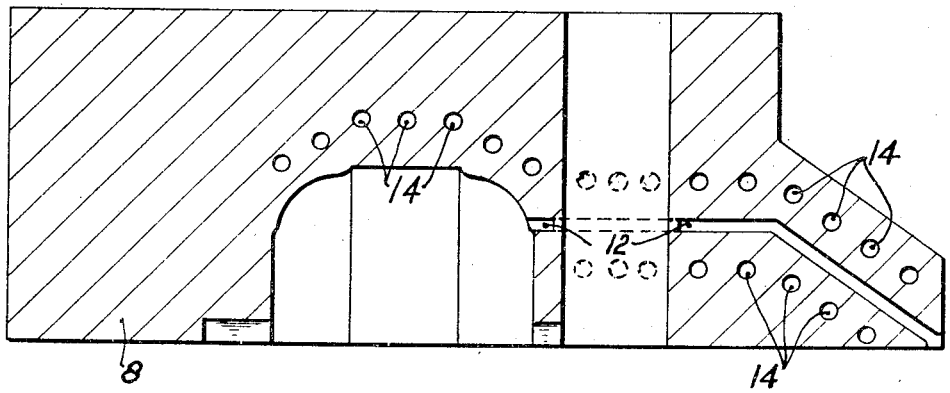
Figure 3:
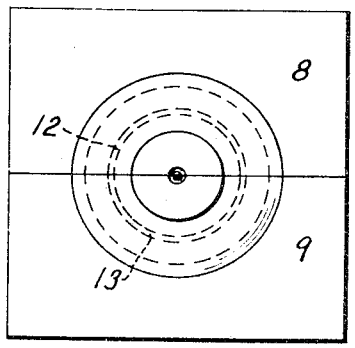
Figure 2:
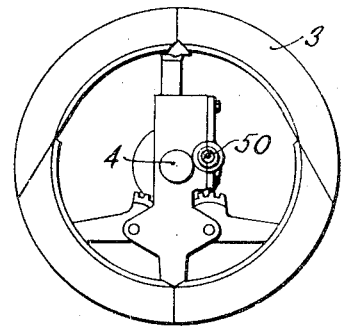
Figure 7:
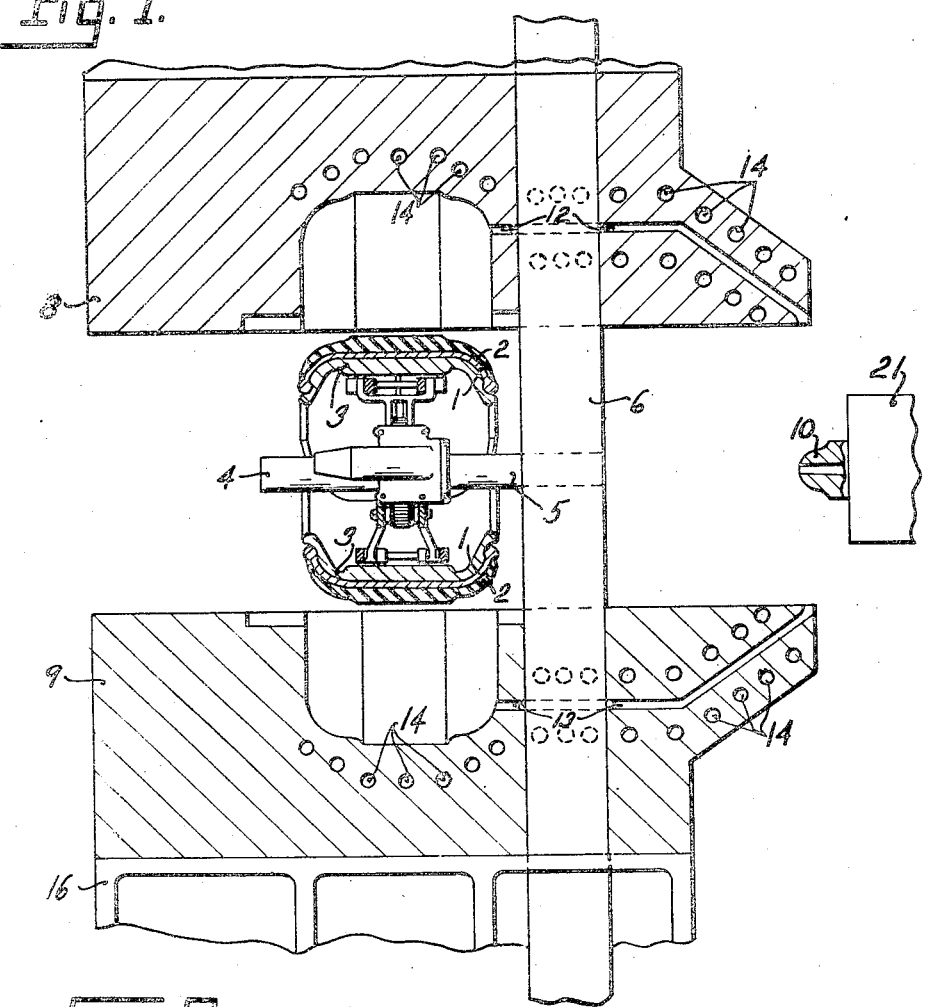
Figure 9:
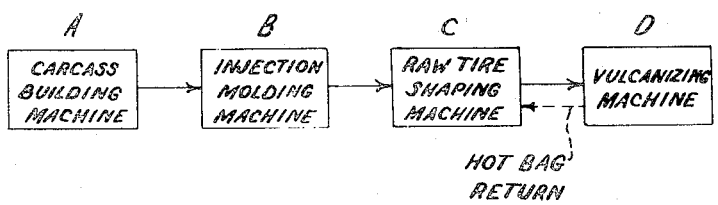

In the drawings:

Fig. 1 indicates two sections of a tire carcass, before and after having its tread or covering rubber applied;

Fig. 2 indicates a side view of a conventional carcass building drum, without a carcass on it;

Fig. 3 indicates one face of the assembled mold for molding in an injection molding machine;

Fig. 4 indicates a section of a mold part to be used as part of an injection molding unit;

Fig. 5 indicates a hydraulic press for use with the mold, with parts cut away showing the mold in section;

Fig. 6 is a section on line 6—6 of Fig. 5;

Fig. 7 indicates positions of parts when the mold is opened up;

Fig. 8 indicates an injection molding machine partly in section but without the mold; and Fig. 9 is a diagram indicating a tire manufacturing procedure using the method of this invention in its full scope for all possible benefits.

Several of the elements indicated in the drawings are old. The tire carcass 1, commonly built up of rubberized fabric plies with the edges anchored to endless beads, before its tread or covering rubber 2 (Fig. 1) is applied, is an old conventional type such as is commonly built on a carcass building machine such as one having a collapsible sectional building drum 3 mounted on a mechanism to handle the drum. Such a machine is merely indicated in Fig. 2. A specific form is fully disclosed in Lehman's Patent No. 1,832,489 of 1931 which for convenience is the one indicated. The element of the carcass building "tool" indicated in Fig. 2 is an old type generally and others are available. In this invention such a tool is to be used also as part of the mold. It is preferred here to make any such type used especially rugged and as indicated to add a stub support 4, on one side, to help support this "tool" for proper position in the mold to be described, and to use a support 5 fixed to a vertical post 6 which extends through upper and lower mold portions to stationary members of the press (Figs. 5, 6 and 7). The post 6 does not move but the mold halves move on it when opening the mold.

Referring back to the tire carcass 1, when its tread 2 is made and applied in the mold according to this invention, the combination product is a structure having new characteristics. Its tread rubber has never been spliced. Each profile of this rubber at every successive point around the tread circumference is the same because formed with the precision of predetermined dimensions in a mold cavity. The weight of the tread rubber is predetermined in exactly the desired amount, and this weight is balanced with precision, circumferentially and transversely. All the tread rubber is bonded to the carcass simultaneously with its tread formation in a closed mold. These are some of the improved characteristics, to be explained further, which are built into the tire according to the method of making it.

It will be a convenience to refer to the covering rubber to be formed and applied to the carcass as the tread rubber. The tread, of course, is technically the heavy central band part. Rubber for the sidewalls extending from the tread edges down to or adjacent the bead edges may for convenience be considered with the tread. A main idea herein is to handle the manufacture and application of the heavy band of tread rubber in a new way. Side wall bands may be usefully handled integrally with the tread as may any other bands desirably made and applied as the tread is.

Considering the making of the tread and its application to the carcass, the mold 7 of Fig. 3 consisting of cooperating mold halves 8 and 9, indicates one in which the tool of Fig. 2 with the carcass on it, can be mounted as part of the mold. This mold then has a tread forming cavity, its bottom side is the carcass 1, its top side has the shape at the top of the tread 2. This mold cavity is made with precise dimensions corresponding to those desired for a tread of exactly balanced rubber placement, both circumferentially and transversely. Such a tread 2 is originally formed and simultaneously applied in its original formation step to the carcass 1 by injecting rubber hot enough to flow under pressure to fill the cavity of the closed mold 7 and, when full, applying great pressure in the nature of hydraulic pressure to the rubber of the filled cavity through the mold entrance. Such pressure is held on conveniently by the injection molding machine until the tread sets enough to hold its form. The carcass is, of course, heated by the hot rubber in such tread molding operation. The carcass with the tread is preferably removed from the mold while both contain a lot of heat from the operation. This feature will be referred to again later, after more detail is given on the tread molding step.

A section of the upper half 8 of mold 7 is indicated in Fig. 4 but without any part of the carcass building tool 3 in the indicated section. The upper and lower mold sections 8 and 9 are indicated in Fig. 5 as assembled with said building tool 3 carrying carcass 1, which becomes part of the mold in the assembly before the mold is closed and ready for mold cavity filling by the mold injection machine. A nozzle 10 is indicated in Fig. 5 in relation to the mold filling. The nozzle 10 of such machine has a movable relation to the sprue or mold entrance 11 indicated by the provision of a piston and cylinder 60 to move the nozzle; see Fig. 8. Such relation is common in such machines, as used generally. The nozzle 10 is adapted to make a pressure fit with the sprue 11 during the filling and pressure step. The injection nozzle is afterwards moved back for the mold to open and its product taken out, all as is generally known in the use of such machines apart from tire making.

Figs. 5, 6 and 7 indicate the runway passage means 12 and 13 through the mold from nozzle 10. The passage means to the mold cavity is preferably, not necessarily, annular. One half is in one of the mold halves 8 and another in the other mold half 9 as indicated. The passage means 12 and 13 may have small cross mold supports, not shown, so that, when the mold is closed, they make, in effect, one annular passage. Such means is preferably shaped as an annular ring-opening just above a bead of the carcass. Thus the tread rubber in its hot flowable condition can be moved under pressure by the injection machine to fill the tread cavity of the mold in a good way. The cavity will be provided with vent or bleed holes, not shown, to get the air out.

It is preferable that mold halves 8 and 9 be provided with temperature control means, and one form of such means has been indicated in the drawings by passages 14 radially spaced from, and at right angles to, the passage halves 12 and 13, and which extend into the mold to surround the mold cavity. The passages 14 are semicircular in form in each mold half, and form in effect circular passages when their ends are brought together upon the closing of the mold halves 8 and 9. Means are provided, not shown, to introduce control fluid to the passages 14 so that the temperature and plasticity of the injected tread rubber is under close control along its entire path—from the nozzle 10, along the passage halves 12 and 13 and finally in the mold itself. This temperature control means is merely indicated and its way of arranging for circulation of temperature controlling fluid can be any one of many ways similar to the ways used in controlling the temperature of mold parts by a circulating mechanism.

The hydraulic press construction is only generally indicated. It is usual in injection molding units. It has upper and lower platens 15 and 16 slidably mounted on guide posts 18 and operated to open the mold or to hold it closed tightly under high pressure. Dowel guides 19 fixed to upper platen 15, project through upper mold half 8 to fit into sockets 20, having bushings, in lower mold half 9.

It will be seen from Fig. 5 that the two shaft supports 4 and 5 have fitting sockets in the mold parts to position the carcass holding tool 3 with its drum and the carcass on the drum in correct position to make the underside of the mold cavity. It will also be seen how the injection machine is positioned in relation to the mold, that the tire carcass forms the inner wall of the mold cavity and how the cavity is to be filled, that is, from its communication with annular opening from passage means 12 and 13 just above the adjacent tire carcass bead.

In Fig. 7 it will be seen that, as the mold halves 8 and 9 are separated by the action of the hydraulic press, access is gained to the carcass and the molded tread thereon, supported on the collapsible drum 3. It is an easy operation to collapse the drum (by application of a wrench on nut 50, Fig. 2, as usual in collapsible tire building machines), remove the newly treaded carcass and replace it with a bare carcass to start the cycle of operation once more. It is preferred to keep the tool of Fig. 2 assembled with the mold parts and to build the carcasses on separate "tools" but if the desired carcass building tool could be inserted in and taken out of the mold. Ordinarily the building drum of carcass building machines is not rugged. In my use of such a machine with the mold, it is desirable to have a rugged drum. The pressure of molding is applied by the injection machine. It is a high pressure which the collapsible drum holding the carcass, as a mold part, must withstand with rigidity. Therefore I prefer to use a drum in the mold of sufficient thickness and make the collapsible mechanism of sufficient strength for my molding purpose and to build the carcass building machines of ordinary strength for mere carcass building action.

Generally considered the injection machine and ways of molding articles by it are well known. The machine is a molding "tool" here specially adapted to carry out the new method disclosed. But a preferred way of practicing the method involves using an injection machine which is not the conventional old type. This will now be explained, with particular reference to Fig. 8.

The injection machine disclosed is conventional routine structure with respect to a suitable nozzle 10, a cylinder 21 adapted to hold sufficient supply of molding material intermittently dropped through feeding passage 22 for injection piston 23 to intermittently force the right quantity of material through the nozzle under the hydraulic pressure applied in cylinder 24. The arrangement so far will be fully understood from knowledge of the conventional injection machine.

To carry out my method in the preferred way, a "Banbury" mixing machine 25, is used with its outlet positioned to drop its intermittently mixed batches through feeding passages 22 to injection cylinder 21. The "Banbury" machine per se is well known and in wide use by tire manufacturers to mix "rubber" batches. When mixing for tread rubber the batch contains other things than rubber, such as accelerators, carbon black, and materials conventionally used, and the mixing per se is well understood and important. The ingredients are different for different uses to which the "rubber" batch is intended in the tire factory. They are different for different grades of treads, each one to be put on its particular grade of tire. A first grade truck tire is made from a different rubber batch than would be used for a second grade passenger tire in the same factory. These circumstances customarily result in large reservoirs or stock piles of made up material or batches, involving the most careful kind of schedule controls and watching in the factory operations as customarily carried on, to use the expensive factory machines and labor as economically as can be done under the conditions. In addition to the reservoirs of banked up batches, there are the operations of tubing or calendering individual treads, "booking" or piling such treads, transporting them to the carcass building machines and hand "tailoring" and applying them on the carcass. These prior art conditions cause trouble and expense in the manufacturing procedure and are sources of defects in the final tire product.

My method has for one advantage substantially avoiding the difficulties of the routine just briefly mentioned. The "Banbury" batch mixing machine to prepare the tread rubber is closely associated with my method according to its preferred and new practice. This practice has other advantages which will be pointed out.

An important characteristic of injection molding operations is the necessity for close control on the amount of heat in the material as it is injected to fill the mold. In my method this is particularly important because the desired heat for the injection to the mold is nearly the amount which will start the accelerator action in the tread rubber batch and I desire to delay any such action until the tire is in its vulcanizing mold. The vulcanizing temperature is wanted there rather than in the making of tread.

Considering the importance of getting the heat in the rubber and of controlling the heat for the desired amount in the molding step of my method, and getting a desired relation of steps for rapid operation I will now discuss how this is done.

Not the batch but preferably all the ingredients of a batch of desired tread rubber are put into hopper 26 of "Banbury" machine 25, Fig. 8. They are fed from the hopper to mixing chamber 27 just after a mixed batch is dropped from it through gage 28 down passage 22 to cylinder 21. Weighted piston 29 is up when chamber 27 is being charged. It is brought down to hold the charge against the "Banbury" mixing rolls. These are driven in the usual way, as by motor 30. They knead the ingredients together, pressing, pinching and folding the mass and thereby generating heat internally of the mass by the severe working of its parts together all the way through its bulk. The heat thus generated is a function of the power used in the mixing. The quantity of heat put in the mass can be easily derived from a reading of a watt meter on the motor power line. It can be controlled too by timing the motor operation. These features of the "Banbury" machine are known per se. They have a particular importance and I will point out their relation in the combination of steps preferred for my method.

The plan is to drop each mixed batch, at a predetermined temperature, directly through feeding passage 22 to the cylinder 21 of the injection molding machine. This cylinder may be heated, conveniently by rings of heating wires, not shown. This heating need only be enough to avoid heat loss from the mixed batches, one or more of them being in the cylinder 21 at any one time. When piston 23 acts to fill the mold it will eject about eight pounds of rubber for the tread of a 6.00—16 inch tire and of course proportionately for larger sized tires. One "Banbury" machine is capable of mixing enough rubber to make many more than 100 tire treads per hour. So the method being disclosed will not need to be slowed down to wait for rubber. As I will point out the method steps can be carried out rapidly, the molding and applying of one tread to one carcass will take but a short time. The total quantity of "rubber" handled each hour will be large. As mentioned, this "rubber" may start into the method use from its cold ingredients. On each carcass it will leave the mold with a lot of heat left over from its molding. It is planned to use such left over heat in additional steps. The rapidity of operating steps leads to important advantages.

A known characteristic of the injection molding machine per se, is the rapidity of its operation in molding plastic products in the field of plastics. It is commonly used in that field, particularly for products of small size or weight. My molding step involves a relatively very large size and weight. But the rapidity of the molding step is characteristic of the injection molding machine in my use even though the produce be as large as it is. It will take only a matter of seconds to fill the mold with the tread rubber, less than the time to cool the rubber enough to remove the thread from the mold.

My mold should be adequately cored to permit control of its temperature. This has been indicated. The plan is to inject the rubber, high enough in temperature to provide for good flowing characteristics but not high enough to start accelerator action. The annular runway and entrance to the mold cavity will help it fill quickly because the cavity is also annular. As soon as it has cooled enough for the rubber to hold its form, the mold is opened and the partially formed tire is removed. Another carcass is put in the mold to receive a tread. When the mold is opened by separating upper and lower halves, Fig. 7, the rubber breaks off close to the bead where the runway passage means 12 and 13 joins the cavity. The runways may be arranged generally in halves each of a half annulus form with matching walls, not shown, at their abutments, to avoid the need of breaking off rubber except at their openings adjacent the runway means and the mold cavity and at the nozzle joint 10. Of course, small cross rods or the like, not shown, will be desirable to support the mold parts through which the runways pass. It should be noted, as indicated in the drawing, that the runways straddle the openings in the mold halves where the stationary post 6 passes through them. The runways do not pass through the post or into the opening for the post but go around them. But the desired construction provides for the effect of an annular runway and entrance to the mold cavity. The runways are filled with rubber between molding operations and the mold parts are planned as indicated to prevent excessive heat loss from such rubber between successive molding injection operations so that such rubber will be flowable when pressure is applied to fill the mold.

In the molding step, the action is to have the piston pressure inject the rubber to fill the cavity and in addition when the cavity is all filled to apply the great pressure of the injection molding machine. It is applied in uniform hydraulic fashion to press all the tread rubber simultaneously when in highly heated condition against the carcass. The form of this rubber is held by the tread form of the mold. This rubber will not then be displaced from its precise position of balance placement with relation to the carcass but it will be applied under great force and while in highly heated condition, preferably almost at the vulcanizing temperature, down onto the tread supporting portion of the carcass surface to get a bond between carcass and tread of improved characteristics. The position of this better bond is indicated by a diagrammatic bond dash line in Fig. 1.

It should be noticed too that the final pressure applied in the molding step and kept on until the rubber sets enough for removal, gives this advantage. In the "rubber" as it flows to fill the cavity there are liable to be volatile ingredients. If they were left free to volatilize until the rubber sets they would volatilize and cause trouble. As the hot rubber flows under pressure to fill the mold the pressure merely causes flowing. There is a tendency at that time for some ingredients of the material to volatilize. When the rubber of the full cavity is full it is given the final hydraulic pressure, when the rubber is not flowing. The pressure is then static pressure. Then any gasified elements will be solidified before the rubber sets. The advantage is that the tread rubber is not troubled with bubbles nor is the bond with the carcass made weak by bubble spots.

The time of setting is the controlling time with respect to the speed of operating the method. It can be shortened by controlling the temperature of the mold by a circulating medium through the cored passages. Of course, the time of molding per tread will vary with conditions. It will be seen, however, upon comparison with any prior art method of making and applying treads to tire carcasses that the new method will be very much faster. So far as the tread work on tires is concerned it can be done by the new method with the result that many more tires per hour can be made with many less men employed in the work on any comparable basis.

The way disclosed of getting the tread rubber formed, precisely balanced in its annular shape, and bonded to the carcass is in sharp contrast to the way of routine making and applying tread rubber in the tire factories. My new way requires no splice to make the tread. The tire product troubles caused by splices are notorious in the business. The splice is a weak "link" in most tire treads. In the new method there is no splice in the tread. This point is mentioned by itself to emphasize it and because of its importance to the quality of the tire product.

The absence of any tread splice, the precision with which the tread rubber is laid on the carcass to give it a weight balance around and across the carcass, and the strength of the bond between the carcass and the tread are prime factors in making a better tire product. My method shows a way to make the better product in the respects mentioned.

Reference will now be made to additional method steps of advantage in the tire manufacture. The raw tire is subsequently shaped more than is indicated by Fig. 1 to get it into the vulcanizing mold. A heavy rubber curing bag, used again and again, is put in the raw tire when it is further shaped and the bag goes with the tire into the vulcanizing mold. Fluid pressure put in the bag, forces the tire against its mold for the vulcanizing step. My planned procedure is to use a curing bag hot from use in curing one tire, with a raw tire hot from its tread molding step according to my method as before described, shape the hot tire as its hot curing bag is inserted, and put this hot assembly into a vulcanizing mold, when the latter is hot from an immediately preceding tire vulcanizing use. This procedure will save a lot of heat as compared to any prior art procedure to reach the point of closing the vulcanizing mold on a raw tire to start the tire vulcanizing step. It will lead to a substantial advantage in economy for the tire manufacturer.

Recalling the way I form the tread and apply it to the carcass and with the use of heat generated by mixing the tread rubber in the "Banbury" mixer as part of the step in using the injection molding unit, it will be seen that a substantial part of this same heat is used to advantage through five of my tire making steps; (1) to help mix and put the tread rubber batch in condition to flow under pressure, (2) to form the tread in a mold, (3) to bond the tread to the carcass under heat and pressure, (4) to shape the carcass with the tread on it when both are hot for easier shaping, (5) to have the raw tire hot, when it goes into the vulcanizing mold to economize heat in the carrying out of the vulcanizing step.

Rubber is a poor conductor of heat and the heat saved from having the rubber internally carrying heat when put in the vulcanizing mold is more of a saving than it would appear to be without full consideration of all the facts involved.

My method of tread forming and applying tread to carcass is adapted to combine with the additional steps of tire manufacture up to and including part of the vulcanizing step. It is adapted to supply part of the heat used in the vulcanizing step. I have pointed out some of the product improvements which are built into the tire by the method.

Reference will now be made to another advantage for which the method is adapted and one which is not immediately obvious. Tire manufacture can now be carried on in a substantially simplified manner as compared to the routine of today's tire factory, the latter when fully examined being relatively complicated and expensive. In Fig. 9 is shown a diagram to indicate the new way. A carcass building machine is put at station A adjacent an injection molding machine unit at station B adapted for the tread work described, a raw tire shaping machine is put at station C, also adjacent to station B, and a number of vulcanizers are put at station D adjacent to station C. As tire carcasses are built at station A, they can be intermittently finished one by one in time for each one to be put immediately in the unit at station B for its tread; one all treaded may be put immediately, when hot from station B and with a hot vulcanizing bag from a past vulcanizing use at station D, into the shaper at station C and a shaped and "bagged" raw tire can be put immediately from the shaper at station C into a vulcanizer at station D. Of course the number of machines will need to be figured out differently for different stations according to the times of their individual operation. We know that a small passenger car tire has a carcass which can be made very fast while a large truck tire carcass will take much longer to build. The tread work in the sequence is a fast operation, and takes care of the product built on one small carcass building machine and certainly more than one when the carcass machines are for large truck tires. Consider that a number of carcass building machines can be related to one injection molding machine for the tread work, so as to keep the work of the two kinds of machines in step without any troublesome time loss between their operations. The shaping machine at station C has a very fast operation. A routine shaping machine can certainly take care of all carcasses as delivered immediately from one tread molding machine. The vulcanizing step requires more time than any other step. Enough vulcanizers will be used at station D to have one ready to receive a raw tire as soon as finished from its shaping step at station C, but the vulcanizers will work faster than in the usual routine. This is because the raw tire with the vulcanizing bag has substantial heat in the product from the building step at station B and heat in the vulcanizing bag "tool" taken from previous use at station D, to avoid a lot of heating up to the vulcanizing temperature at station D. So too the carcass building machines may finish their operations faster because there is no tread work in the carcass machine step according to the new way of forming and applying the tread at station B.

It is not attempted here to state the exact timing of each step or the exact amount of equipment in the whole plan. Enough is stated to disclose the steps of the new procedure for simplifying tire manufacture. Such simplification is made feasible by my new method.

It should be noted that there need be no stopping of tread material in idle condition for mere storage between the time when the cold ingredients go in the "Banbury" mixer at station B and the time when the ingredients become the tread portion in the finished vulcanized tire at station D. So too between the time when the material parts of a tire carcass are put on a working machine for building, that material need not halt at any storage point before it becomes part of the finished vulcanized tire at station D.

So far as I know there is no prior art practice known which moves the material for a tire through the tire building steps with the economy of my method. Procedure in the modern tire factory includes many "jams" of partial fabrications merely stored in "reservoirs" between different operations.

My experience in prior art tire making methods shows me that the most serious troubles are caused by the work of preparation for the making of treads, different "rubbers," of different sizes, and for the tread work generally. This is trouble apart from and in addition to troubles resulting from the product defects. Both kinds of trouble are solved by my new method practice.

An exceedingly important benefit, of those pointed out and made feasible by this disclosure, is found in the improved product, with respect to its precision balanced tread. Assume that the weight of the rubber tread is eight pounds. It is important that tires on opposite sides of a fast running vehicle be accurately matched in weight. My method will give an exact tread match, eight pounds for each tread. It is important to have the eight pounds weight in each tire distributed around and across the tire in the uniform fashion of weight in a fly wheel. The tread weight on a high speed tire acts as the weight of a fly wheel. If it is not put in balance for high speed, vibrations are set up and cause road accidents. The example of an eight pound tire tread for a light passenger car tire is one near the small size extreme of automobile tire. The other extreme in large truck tires needs only to be considered to show the extreme importance of getting the heavy tread weight in balance for high speed rotation. My method will give exact "fly wheel" balance for high speed rotation. My method further results in less "separation pull" between tread and carcass at high speed. It is important that the method avoids completely the danger of spliced ends of treads pulling apart.

At first sight it might seem that the vulcanizing step of tire building which vulcanizes the tread on the carcass, will give some or all of the product benefits I have emphasized. Consideration shows that these benefits are not given by the vulcanizing step.

As I pointed out in the beginning the new method gives the benefits of a better tire product and makes feasible a more economical manufacturing procedure for making tires generally and it is a point too that a better product can now be made at less cost than prior art methods.

Regarding the apparatus indicated along with the disclosure of the method invention, it will be clear that its details may take many forms. I intend to file a separate application to claim invention in apparatus useful for carrying out the method disclosed.

Having disclosed the invention of this specification, I claim:

1. The method of forming a pneumatic tire casing which comprises constructing a multi-ply tire carcass on a shaping drum of less crown diameter and greater bead spacing than the desired corresponding dimensions in the finished tire, assembling the casing with mold members to provide an annular mold cavity disposed wholly, and only, over the carcass portion to be covered with tread rubber with said carcass portion providing the inner wall of the annular cavity, mixing a quantity of a tread rubber compound to raise its internal temperature close to but below the vulcanizing temperature of the compound, immediately and directly injecting said hot mixed compound into said annular cavity under high pressure, maintaining said heat and pressure after the cavity is filled until the temperature of the carcass is raised to the temperature of the tread compound and the tread rubber is molded to the desired unvulcanized tread shape and bonded to the surface of the hot carcass, reducing the temperature of the carcass and tread to, but not substantially below, the form sustaining temperature of the compound, and removing the hot treaded carcass from the mold.

2. The method of forming a pneumatic tire casing which comprises constructing a multi-ply tire carcass on a shaping drum of less crown diameter and greater bead spacing than the desired corresponding dimensions in the finished tire, assembling the casing with mold members to provide an annular mold cavity disposed wholly, and only, over the carcass portion to be covered with tread rubber with said carcass portion providing the inner wall of the annular cavity, mixing a quantity of a tread rubber compound to raise its internal temperature close to but below the vulcanizing temperature of the compound, immediately and directly injecting said hot mixed compound into said annular cavity under high pressure, maintaining said heat and pressure after the cavity is filled until the temperature of the carcass is raised to the temperature of the tread compound and the tread rubber is molded to the desired unvulcanized tread shape and bonded to the surface of the hot carcass, reducing the temperature of the carcass and tread to, but not substantially below, the form sustaining temperature of the compound, removing the hot treaded carcass from the mold, expanding the carcass and tread to approximate tire shape with a minimum reduction in temperature and finally remolding and vulcanizing the hot tread to its final pattern, and bringing the carcass to full tire shape, by pressing the hot tire against the cavity walls of a vulcanizing mold under internally applied fluid pressure to get the final degree of expansion in the tire while simultaneously raising the temperature of the tire to vulcanizing temperature.

CHARLES E. MAYNARD.

REFERENCES CITED

The following references are of record in the file of this patent:

UNITED STATES PATENTS

| Number | Name | Date |
|---|---|---|
| 1,101,053 | Bland | June 23, 1914 |
| 1,612,566 | Brown | Dec. 28, 1926 |
| 1,615,472 | Midgley | Jan. 25, 1927 |
| 1,650,078 | Laursen | Nov. 22, 1927 |
| 1,658,565 | MacDonald | Feb. 7, 1928 |
| 1,745,482 | Goodwin | Feb. 4, 1930 |
| 1,918,532 | Geyer | July 18, 1933 |
| 2,297,354 | Hawkinson | Sept. 29, 1942 |
| 2,421,097 | Lakso | May 27, 1947 |
| 2,422,266 | Steinke | June 17, 1947 |